United States Patent
Pandey et al.

(10) Patent No.: US 11,599,935 B2
(45) Date of Patent: Mar. 7, 2023

(54) COMPUTER PROGRAM PRODUCT, COMPUTER IMPLEMENTED METHOD, AND SYSTEM FOR COGNITIVE ITEM SELECTION WITH DATA MINING

(71) Applicant: KYNDRYL, INC., New York, NY (US)

(72) Inventors: Diwesh Pandey, Bangalore (IN); Aaron K. Baughman, Research Triangle Park, NC (US); Todd R. Whitman, Southbury, CT (US); John P. Perrino, Hedgesville, WV (US)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 16/397,446

(22) Filed: Apr. 29, 2019

(65) Prior Publication Data

US 2020/0342520 A1    Oct. 29, 2020

(51) Int. Cl.
| | |
|---|---|
| *G06Q 30/00* | (2012.01) |
| *G06Q 30/0601* | (2023.01) |
| *G06F 3/01* | (2006.01) |
| *G06Q 50/12* | (2012.01) |
| *G06N 20/00* | (2019.01) |

(Continued)

(52) U.S. Cl.
CPC ......... *G06Q 30/0641* (2013.01); *G06F 3/011* (2013.01); *G06N 20/00* (2019.01); *G06Q 50/12* (2013.01); *G06T 19/003* (2013.01); *H04L 9/0637* (2013.01)

(58) Field of Classification Search
CPC .... G06Q 30/0641; G06Q 50/12; G06N 20/00; G06F 3/011; G06T 19/003; H04L 9/0637

USPC .......................................................... 705/27.1
See application file for complete search history.

(56) References Cited

U.S. PATENT DOCUMENTS

| | | | |
|---|---|---|---|
| 8,195,133 B2 | 6/2012 | Ramer et al. | |
| 9,342,216 B2 * | 5/2016 | Padgett | ................ G06F 3/0482 |
| 2007/0061209 A1 | 3/2007 | Jackson | |

(Continued)

FOREIGN PATENT DOCUMENTS

WO   WO 2017092030 A1   6/2017

OTHER PUBLICATIONS

Quinn, S. (Jun. 3, 2017). The Future of Food: Holographic Menus, Droid Delivery and Virtual Cocktails. All Coming to a Restaurant Near You, Says Sue Quinn. Telegraph Magazine, , 65. Retrieved from https://www.proquest.com/magazines/future-food/docview/1906936603/se-2 (Year: 2017).*

(Continued)

*Primary Examiner* — Michelle T Kringen
*Assistant Examiner* — Arielle E Weiner
(74) *Attorney, Agent, or Firm* — Erik Swanson; George S. Blasiak; Heslin Rothenberg Farley & Mesiti P.C.

(57) ABSTRACT

Methods, computer program products, and systems are presented. The methods include, for instance: ascertaining a user state of a user based on user state data for a cognitive menu selection service from an eatery by use of an electronic menu system. Selection criteria to request one or more items from menus of the eatery is determined based on the user state. A request including the selection criteria is sent and the one or more items corresponding to the selection criteria is obtained and presented to the user by use of a customized virtual reality interface on a personal device of the user.

20 Claims, 8 Drawing Sheets

(51) Int. Cl.
*H04L 9/06* (2006.01)
*G06T 19/00* (2011.01)

(56) References Cited

U.S. PATENT DOCUMENTS

| | | |
|---|---|---|
| 2012/0233002 A1 | 9/2012 | Abujbara |
| 2013/0046642 A1* | 2/2013 | Jacobus ................ G06Q 50/12 |
| | | 705/15 |
| 2013/0311310 A1 | 11/2013 | Zell |
| 2015/0135077 A1 | 5/2015 | Fuzell-Casey |
| 2015/0248651 A1* | 9/2015 | Akutagawa ............ G06Q 50/01 |
| | | 705/7.19 |
| 2016/0203109 A1* | 7/2016 | Ho ........................ G06F 40/114 |
| | | 715/246 |
| 2018/0096440 A1* | 4/2018 | Lopez ................ G06Q 30/0259 |
| 2018/0190375 A1* | 7/2018 | Chapela ............... A61B 5/6803 |
| 2018/0276710 A1* | 9/2018 | Tietzen ................. G06N 20/00 |
| 2019/0295440 A1* | 9/2019 | Hadad .................. G06F 40/137 |
| 2020/0034916 A1* | 1/2020 | He ..................... G06Q 30/0635 |
| 2020/0066181 A1* | 2/2020 | Hadjigeorgiou ....... G16H 20/60 |

OTHER PUBLICATIONS

Anonymous, "Menu Visualization based on Viewer Profile.", IP.com Disclosure No. IPCOM000246657D, Publication Date: Jun. 24, 2016.

P. Mell, et al. "The NIST Definition of Cloud Computing", NIST Special Publication 800-145, Sep. 2011, Gaithersburg, MD.

* cited by examiner

COMPUTER PROGRAM PRODUCT, COMPUTER IMPLEMENTED METHOD, AND SYSTEM FOR COGNITIVE ITEM SELECTION WITH DATA MINING

TECHNICAL FIELD

The present disclosure relates to cognitive information service, and more particularly to methods, computer program products, and systems for personalized assistance in selecting an item based on cognitive analysis.

BACKGROUND

Service industries offering many items for patrons to choose from commonly provide their selections in various formats according to business needs and convenience. In restaurants, for example, menus are often presented to the patrons in various forms including, a number of printed booklets for separate lunch/dinner menus, weekday/weekend menus, leaflets for seasonal/daily specials, and a separate list for wine/beverage and/or desserts. For certain specials, particularly when temporary, restaurants often have their servers verbally recite such temporary offerings at the table to patrons without any visual aid or written material. Depending on the type of food served, certain casual restaurants have a billboard of menus along with chalkboard signs for temporary menus, which are visible to a number of customers simultaneously but away from tables where the patrons are sitting, for example, at the entrances or around the register. Certain electronic menu system that offer some form of entertainment, advertisements, ordering, and checking out on tablets installed at tables of restaurants are commercially available.

SUMMARY

The shortcomings of the prior art are overcome, and additional advantages are provided, through the provision, in one aspect, of a method. The method includes, for instance: ascertaining, by one or more processor, a user state of a user based on user state data, where the user is being provided with a cognitive menu selection service for an eatery by use of an electronic menu system; determining, by the one or more processor, selection criteria for the user on one or more items from menus of the eatery in a request, where the selection criteria correspond to the user state from the ascertaining; obtaining, by the one or more processor, from the electronic menu system, the one or more items from the menus of the eatery, based on sending the request to the electronic menu system, where the one or more items correspond to the selection criteria in the request; and presenting, by the one or more processor, the one or more items from the obtaining to the user, by use of a customized virtual reality interface on a personal device of the user.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
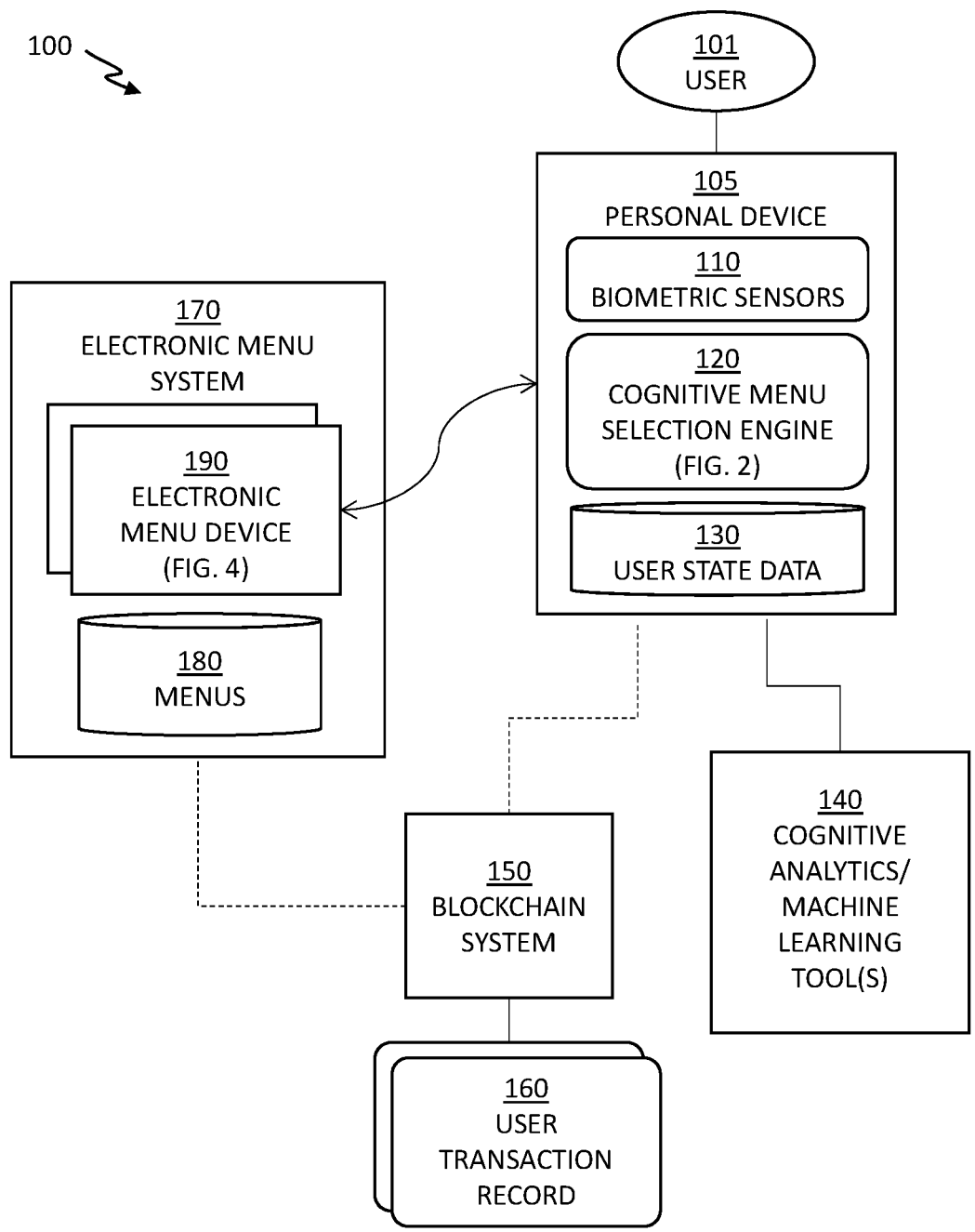
FIG. 1 depicts a system for a cognitive menu selection service, in accordance with one or more embodiments set forth herein.

FIG. 1 depicts a system 100 for a cognitive menu selection service, in accordance with one or more embodiments set forth herein.

The system 100 includes an electronic menu system 170 for one or more eateries and a personal device 105 carried by a user 101, who is visiting an eatery of the one or more eateries serviced by the electronic menu system 170. The eatery participates in and/or offers the cognitive menu selection service by use of the electronic menu system 170. The eatery is represented as the electronic menu system 170 in FIG. 1. In certain embodiments of the present invention, the electronic menu system 170 provides services to a plurality of eateries. The user 101 accesses the cognitive menu selection service by use of the personal device 105. Examples of the eatery include, but are not limited to, a brick-and-mortar restaurant, an on-line site for meal ordering services.

The personal device 105 of the user 101 includes a plurality of biometric sensors 110, a cognitive menu selection engine 120, and user state data 130. The personal device 105 communicates with the electronic menu system 170 during the cognitive menu selection service. The personal device 105 is operatively coupled to a cognitive analytics tools and/or machine learning tools 140. The personal device 105 also has a user interface by which the user 101 provide inputs to and configures operations of the cognitive menu selection engine 120.

The electronic menu system 170 include one or more electronic menu device 190 and a plurality of menus 180 that lists items offered at the eatery, with respective ingredients and nutritional facts for each menu item. The electronic menu device 190 of the electronic menu system 170 communicates with the personal device 105 of the user 101, in order to offer the cognitive menu selection service to the user 101 by use of the personal device 105 and the electronic menu system 170.

Both the electronic menu system 170 and the personal device 105 are operatively coupled to a blockchain system 150 in order to retrieve user transaction records 160 that were previously generated in the context of the cognitive menu selection service and to record a user transaction record 160 that is currently generated as the user 101 places an order while using the cognitive menu selection service. The user transaction records 160 in a transaction history and the user state data 130 in the context of the cognitive menu selection service can be stored with the blockchain system 150 for data mining. The blockchain system 150 was originally designed and used to facilitate transfers of virtual currency, and is being expanded to share and/or record any kind of transaction record in a safer, tamper-proof, and distributed manner. Based on the secure nature of the blockchain system 150, histories of the user transaction records 160 with the user state data 130 from the biometric sensors 110 can be safely stored. The user transaction records 160 can be generated only when the parties in generating a user transaction record 160, which include the electronic menu device 190 and the personal device 105, approve the user transaction record 160 to be generated with the blockchain system 150.

The user 101, upon subscription of the cognitive menu selection service, explicitly authorizes accesses to aforementioned personal information by the personal device 105 and/or the cognitive analytics/machine learning tools 140, and similarly accesses to the user transaction record 160 from the electronic menu system 170 via the blockchain system 150, in furtherance of the cognitive menu selection service. In the context of the cognitive menu selection service, the user state data 130 stored in the personal device 105 and the user transaction record 160 that is accessible through the blockchain system 150 are securely governed by respective privacy policies and access rules regarding information release/sharing and not accessible without the explicit authorization by the user 101. The user state data 130 including the patterns/trends developed by the cognitive analytics/machine learning tools 140 in the context of the cognitive menu selection service are kept securely in the personal device 105 with encryption while the user 101 continues using the cognitive menu selection service. Once the user 101 discontinues the cognitive menu selection service, the personal device 105 destroys all information in the user state data 130 including the patterns/trends developed by the cognitive analytics/machine learning tools 140 from the secure storage in the personal device 105. According to the configuration of the personal device 105 on the cognitive menu selection service, the user 101 is provided with an option to keep the user state data 130 for a certain period of time, in cases when the user 101 wishes to reinstate the cognitive menu selection service within the same period of time.

The biometric sensors 110 of the personal device 105 collects various instances of the user state data 130 and provides the user state data 130 as being collected to the cognitive menu selection engine 120. The biometric sensors 110 would detect various physiological and/or behavioral marks/signs on the user 101 as expressed in the blood pressure, the heart beat rate, body temperature, the level of perspiration, the voice stress level, the blood sugar level, or the like, and collect respective data. The personal device 105 can be implemented as a smart watch or a smart phone with the biometric sensors 110 as customized to read out various physiological information necessary to provide the cognitive menu selection service.

In certain embodiments of the present invention, respective data items of the user state data 130 as collected by the biometric sensors 110 of the personal device 105 can demonstrate statistical significances and/or causal relations as to the choice of food from menus 180 during the cognitive menu selection service. The cognitive analytics/machine learning tools 140 accumulates various training data including the user state data 130 and the user transaction record 160 with each choice of menus over time and builds a selection forecasting model by machine learning that can forecast a choice of menus based on a specific condition with the user state data 130. Once sufficiently trained with actual transaction records, the selection forecasting model can render more accurate selection criteria for the user 101 based on the user state data 130.

In certain embodiments of the present invention, the personal device 105 is implemented by use of wearable Internet of Things (IoT) devices with sensors to detect user states, as well as processing power and network connectivity to run the cognitive menu selection engine 120 and to store the user state data 130. Examples of the personal device 105 that is wearable include, but are not limited to, fitness trackers, smartwatches, and smart bands. In certain embodiments of the present invention, only the biometric sensors 110 of the personal device 105 can be implemented as a wearable device, and the cognitive menu selection engine 120 of the personal device 105 can be implemented separately from the biometric sensors 110 with any type of portable/mobile device for the user 101 with computational power and network connectivity. Further, the user state data 130 of the personal device 105 can also be separately stored in a cloud storage via a network connection or any private network storage for the user 101.

As noted, the biometric sensors 110 of the personal device 105 collect biometric information including, but not limited to, heart rate, brainwaves, stress-related hormones, calorie consumption, blood pressure, body temperature and other vital signs, and muscle bio signals indicating levels of activity on the user 101. The cognitive analytics/machine learning tools 140 utilizes various biostatistics relevant to the respective biometric information to determine the state of the user 101, which is stored in the user state data 130. The cognitive analytics/machine learning tools 140 can accumulate the user state data 130 in relation with selected menu items ultimately recorded with the user transaction record 160 by machine learning.

The cognitive menu selection engine 120 processes the user state data 130 by use of the cognitive analytics tools and/or machine learning tools 140, in order to determine various states of the user 101 that can affect a meal selection of the user 101, including, but not limited to, a physiological state, a medical state, an emotional state, and nutritional needs and dietary restrictions corresponding to respective states as determined.

The cognitive menu selection engine 120 interacts with the electronic menu device 190 in presenting an optimal menu for the user 101 according to the user state data 130 and user transaction record 160 available by way of the blockchain system 150. Detailed operations of the cognitive menu selection engine 120 are presented in FIG. 2 and corresponding description.

As noted, the personal device 105 is coupled to various external tools 140 for cognitive analytics and machine learning, in order to initialize, analyze, and refine the user state data 130. The cognitive analytics/machine learning tools 140, for example, can assemble various information about the user 101 including, but not limited to, weather of the day, various biometric readings of the user 101 for mood, existing medical conditions and dietary plans, calendar schedules for work, meeting, and/or personal events, comments on various food items and dietary concerns, past meal purchases from comparable circumstances, and forecast a list of candidate items that the user 101 is likely to order. Similarly, the cognitive analytics/machine learning tool 140 can be utilized to develop a trend/pattern in meal orders for the user 101 by machine learning methods and integrate the trend/pattern in the user state data 130, in order to make a more accurate forecasting in the future services.

The user 101, upon subscription of the cognitive menu selection service, explicitly authorizes accesses to aforementioned personal information by the personal device 105 and/or the cognitive analytics/machine learning tools 140, and similarly accesses to the user transaction record 160 from the electronic menu system 170 via the blockchain system 150, in furtherance of the cognitive menu selection service. In the context of the cognitive menu selection service, the user state data 130 stored in the personal device 105 and the user transaction record 160 that is accessible through the blockchain system 150 are securely governed by respective privacy policies and access rules regarding information release/sharing and not accessible without the explicit authorization by the user 101. The user state data 130 including the patterns/trends developed by the cognitive analytics/machine learning tools 140 in the context of the cognitive menu selection service are kept securely in the personal device 105 with encryption while the user 101 continues using the cognitive menu selection service. Once the user 101 discontinues the cognitive menu selection service, the personal device 105 destroys all information in the user state data 130 including the patterns/trends developed by the cognitive analytics/machine learning tools 140 from the secure storage in the personal device 105. According to the configuration of the personal device 105 on the cognitive menu selection service, the user 101 is provided with an option to keep the user state data 130 for a certain period of time, in cases when the user 101 wishes to reinstate the cognitive menu selection service within the same period of time.

In certain embodiments of the present invention, the personal device 105 is further enhanced with a customized virtual reality (VR)/augmented reality interface between the user 101 and the electronic menu device 190, in order to improve user experience and satisfaction with the cognitive menu selection service. Exemplary details of customized VR presentation by the personal device 105 are presented in FIG. 5 and corresponding description.

The electronic menu system 170 is operatively coupled to the blockchain system 150 in order to access the user transaction record 160 with a transaction data resulting from instances of the cognitive menu selection service. The transaction data as generated by the electronic menu system 170 based on selections by the user 101 on the personal device 105 are communicated to the blockchain system 150, which records the transaction data in the user transaction record 160.

In certain embodiments of the present invention, the electronic menu device 190 is installed at each table in a physical restaurant that offers the cognitive menu selection service. In certain embodiments of the present invention where the eatery is an on-line site that offers meal ordering/delivery service, the electronic menu device 190 can be implemented as a virtual device providing individual interface for the user 101. Detailed operations of the electronic menu device 190 are presented in FIG. 3 and corresponding description. The restaurant electronic menu system 170 includes a database of menus 180, and upon being requested by the electronic menu device 190, transfers the menus 180 to the electronic menu device 190. The electronic menu device 190, by way of the restaurant electronic menu system 170, accesses the blockchain system 150 in order to update the user transaction record 160 when the user 101 places an order with the electronic menu device 190.

The restaurant electronic menu system 170 and the electronic menu device 190 are distinctively described, because the restaurant electronic menu system 170 can be remotely located to provide the customized menu selection service, while the electronic menu device 190 is to be physically located at the table in the restaurant to interact with patrons, including the user 101, of the restaurant. In certain embodiments of the present invention, an agent of the restaurant electronic menu system 170 can be implemented on the electronic menu device 190, while the menus 180 are implemented as a local database with a customized database management system (DBMS) for frequent updates and specialized search and organization functionalities for respective types of restaurants.

The menus 180 often include many food, beverage, and dessert items. Some restaurants have food sections further divided for appetizers, salads, soups, entrees, combinations, specials, seasonal varieties, and others. Some restaurants organize their menus in sections based on main ingredients such as beefs and pork, poultry, vegetarian, seafood, pasta, and breads. Food choices based on medical conditions such as allergies to particular ingredients, gluten free, low carb-low fat, diabetic diets, glycemic indexes, and numerous other concerns and conditions can also be presented in the menus 180, or the menus 180 include a list of ingredients and other nutritional facts for assisting the user 101 in selecting an item.

Depending on the type of the restaurant, the menus 180 can include up to hundreds of items. Accordingly, if the user 101 is not used to a garden varieties of choices offered in the menus 180 by the restaurant, the user 101 can get easily frustrated and/or take a long time to order. If the restaurant updates the menus 180 very often, and keeps the menus 180 with variations for different days of the week, for lunch and dinner times, with different pricings and different choices, the user 101 can get easily confused as well. Embodiments of the present invention have the menus 180 organized with an extensive sets of aforementioned attributes including, but not limited to, type of dish, ingredient, medical condition, cooking method, price range, food pairing, etc., for efficient search and retrieval.

The user 101, upon subscription of the cognitive menu selection service, explicitly authorizes accesses by agents of the cognitive menu selection service, including, but not limited to, the personal device 105 and the electronic menu system 170 to personal information on the user 101 in various data sources such as personal calendars, social media accounts, medical records of the user 101, and records of similar purchases including the user transaction records 160 in order to facilitate the cognitive menu selection service. The data sources for the cognitive menu selection service described herein operate according to respective privacy policies and rules regarding information release on the user 101. The personal device 105 keeps data collected for the cognitive menu selection service in a secure storage with encryption while the user 101 continues with the subscription.

The electronic menu system 170 providing the cognitive menu selection service can accumulate transaction records in association with respective requests, including the user state data 130 and other factors affecting the transactions, without information identifying the user 101, to improve the cognitive menu selection service in the future. The electronic menu system 170 can establish a more generally applicable menu forecasting model for the transactions, independent from or based on the selection forecasting model established based on cognitive analytics and machine learning of relations between individual preferences, states of a particular user and the selections made on items in the menus 180. The agents of the cognitive menu selection service destroy all information identifying individual users 101 from the secure storage once the users 101 discontinue the cognitive menu selection service.

Figure 2:
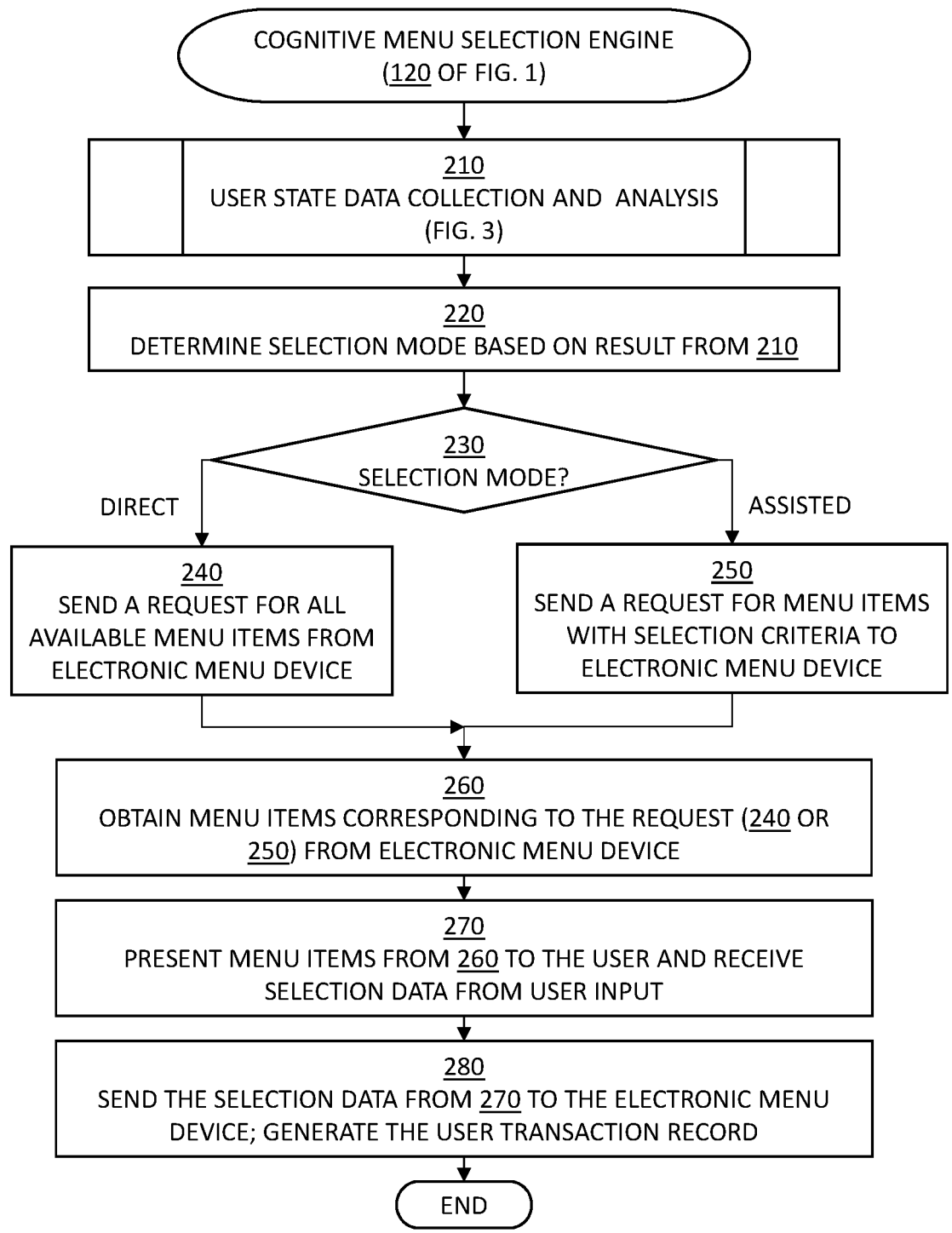
FIG. 2 depicts a flowchart of operations performed by the cognitive menu selection engine on the personal device, in accordance with one or more embodiments set forth herein.

FIG. 2 depicts a flowchart of operations performed by the cognitive menu selection engine 120 on the personal device 105, in accordance with one or more embodiments set forth herein.

As noted, portion of the cognitive menu selection system 110 can be implemented on the personal device 105 of the user 101. Operations of the cognitive menu selection engine 120 described herein are based on certain functionalities of the personal device 105, including, but not limited to, location detection, user monitoring and user state data collection, and frontend interactive interface with the restaurant electronic menu system 170.

In block 210, the cognitive menu selection engine 120 collects the user state data 130 and determines a user state, indicating physiological and/or emotional states of the user 101, which affects a selection mode of the cognitive menu selection service for the user 101 based on the collected user state data 130. The user state affecting the selection mode of the cognitive menu selection service is determined based on the user state data 130 by use of the cognitive analytics/machine learning tools 140. Detailed operations of the block 210 as performed by the cognitive menu selection engine 120 are presented in FIG. 3 and corresponding descriptions. Then, the cognitive menu selection engine 120 proceeds with block 220.

In certain embodiments of the present invention, the cognitive menu selection engine 120 builds a transaction history from previous transactions, including each instance of the user state data 130 respectively associated with each user transaction which had previously been recorded as respective user transaction records 160. The transaction history is utilized as training data for the cognitive analytics/machine learning tools 140 in modeling relationships between the user state data 130 and the user transaction records 160, with context information around a user transaction such as types of restaurants. A machine learning model on the relationships between the user state data 130 and the user transaction records 160 can be used to forecast a likely order, that is, a new user transaction, based on a current instance of the user state data 130 across various factors modeled for the cognitive menu selection service.

In certain embodiments of the present invention, the cognitive menu selection engine 120 collects the user state data by reading inputs from the biometric sensors 110 on the personal device 105 of the user 101. The cognitive menu selection engine 120 subsequently analyzes the user state data by use of a selection forecasting model that associates the user state data with the user state. The selection forecasting model is a machine learning model based on previous transaction history of the user 101 and previous user state data respectively corresponding to each transaction in the transaction history as training data. The cognitive menu selection engine 120 identifies the user state corresponding to the user state data in the selection forecasting model.

In certain embodiments of the present invention, the cognitive menu selection engine 120 facilitates the user 101 to preconfigure certain aspects of the user state data 130 for the user 101, by use of certain user-configured parameters in the cognitive menu selection engine 120. The personal device 105 can be configured to store such user-configured parameters as a user profile for the cognitive menu selection service. The aspects of the user state data 130 that can be statically preconfigured by the user 101 are more of a persistent nature than of a dynamically changing states that should be continuously monitored with the biometric sensors 110 of the personal device 105. For example, if the user 101 has a dietary plan set for a fitness goal, personal preferences as to certain food items, or a dietary restriction based on medical conditions, then the user 101 can statically provide such parameters to configure the cognitive menu selection service without incurring any processing overhead for dynamic monitoring and data collection for such data as the user state data 130.

In block 220, the cognitive menu selection engine 120 determines a selection mode according to a user state as determined from block 210 based on collecting and analyzing the user state data 130. In one embodiment of the present invention, the selection mode is configured with two (2) values of {Direct, Assisted}, where the Direct selection mode specifies that the user 101 will make a choice from all items available from the menus 180, and where the Assisted selection mode specifies that the cognitive menu selection engine 120 presents to the user 101 only food items that fit a selection criteria from the menus 180 of the electronic menu system 170. Then, the cognitive menu selection engine 120 proceeds with block 230.

In block 230, the cognitive menu selection engine 120 determines which value has been set for the selection mode in block 220. If the cognitive menu selection engine 120 determines that the selection mode is set as "Direct", then the cognitive menu selection engine 120 proceeds with block 240. If the cognitive menu selection engine 120 determines that the selection mode is set as "Assisted", then the cognitive menu selection engine 120 proceeds with block 250.

In block 240, the cognitive menu selection engine 120 sends a request for all available items in the menus 180 to the electronic menu device 190, as the selection mode is "Direct". Then, the cognitive menu selection engine 120 proceeds with block 260.

In certain embodiments of the present invention, the cognitive menu selection engine 120 utilizes a same request format with selection criteria parameters to the electronic menu device 190 for both "Direct" and "Assisted" selection modes for efficiency. When the selection mode is "Direct", the cognitive menu selection engine 120 leaves the selection criteria parameters in the request uninstantiated, which will be interpreted as the "Direct" selection mode by the electronic menu device 190.

In block 250, the cognitive menu selection engine 120 sends a request for items in the menus 180 that meets the selection criteria to the electronic menu device 190, for the "Assisted" selection mode. Then, the cognitive menu selection engine 120 proceeds with block 260.

In block 260, the cognitive menu selection engine 120 obtains, from the electronic menu device 190, menu items corresponding to the request sent in either block 240 or block 250. Then, the cognitive menu selection engine 120 proceeds with block 270.

In block 270, the cognitive menu selection engine 120 presents the menu items obtained from block 260 to the user 101 for selection. The cognitive menu selection engine 120 subsequently receives selection data from the user 101 as the user 101 selects a subset of presented menu items that had been presented. Then, the cognitive menu selection engine 120 proceeds with block 280.

In certain embodiments of the present invention, the cognitive menu selection engine 120 utilizes virtual reality (VR) functionalities of the personal device 105 for presenting the menu items.

In block 280, the cognitive menu selection engine 120 sends the selection data as input by the user 101 from block 270 to the electronic menu device 190. The cognitive menu selection engine 120, in concert with the electronic menu device 190, subsequently generates the user transaction record 160 with the blockchain system 150. The user transaction record 160 corresponds to an order by the user 101 with the eatery represented by the electronic menu system 170 according to the selection data from block 270. The user transaction record 160 further includes cognitive analytics information for the selection forecasting model, including but not limited to, the user state data including biometric sensor readings and user-configured parameters on the dietary preferences and restrictions, as well as the restaurant type context information on the eatery. Then, the cognitive menu selection engine 120 concludes processing for a current instance of the cognitive menu selection service.

In certain embodiments of the present invention, the cognitive analytics/machine learning tools 140 constantly learns the user transaction data 130 as generated by new orders and updates the selection forecasting model accordingly.

Figure 3:
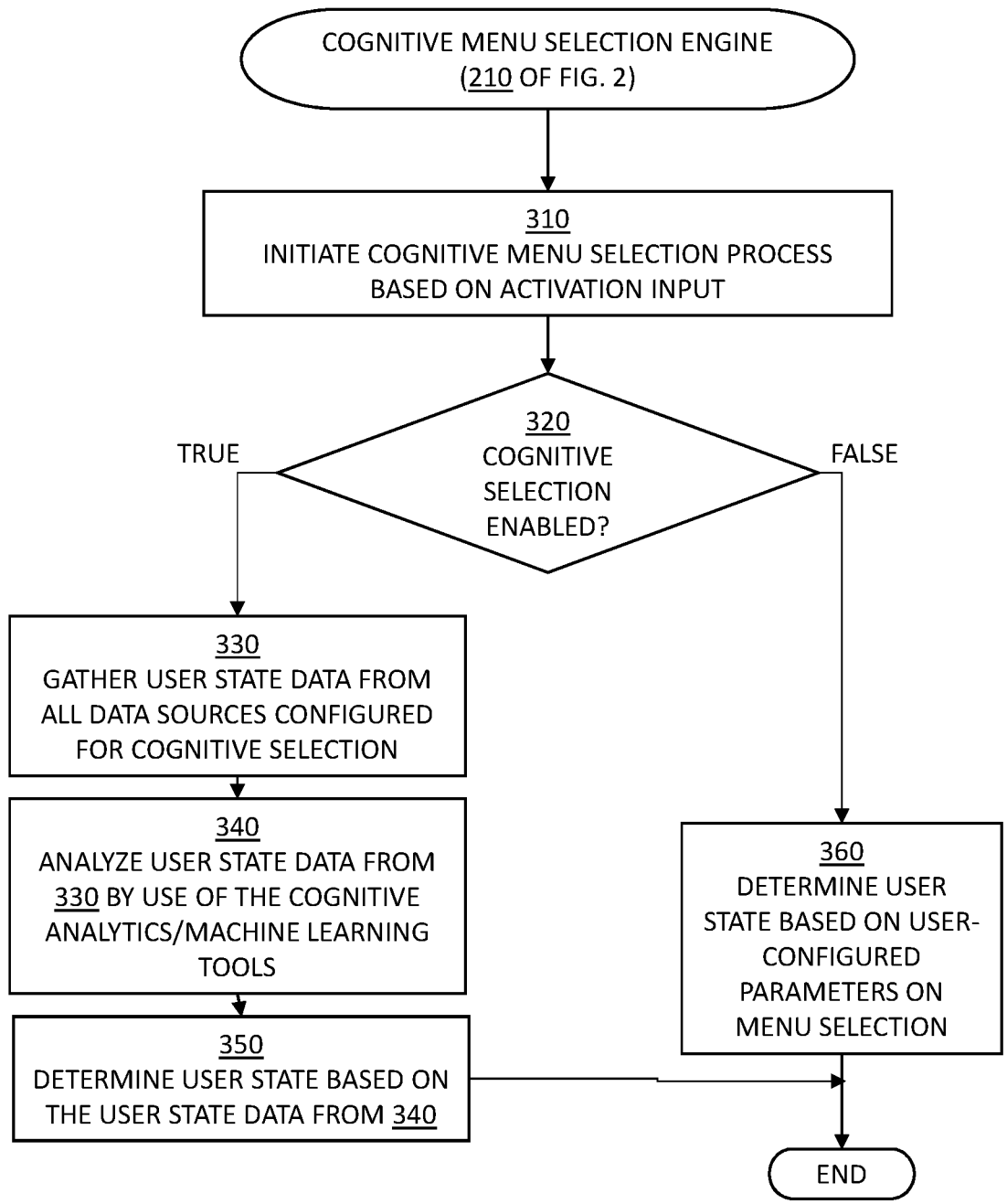
FIG. 3 depicts detailed operations of block 210 of FIG. 2 as performed by the cognitive menu selection engine, in accordance with one or more embodiments set forth herein.

FIG. 3 depicts detailed operations of block 210 of FIG. 2 as performed by the cognitive menu selection engine 120, in accordance with one or more embodiments set forth herein.

In block 310, the cognitive menu selection engine 120 initiates processing for a current instance of the cognitive menu selection service based on a certain activation input. Examples of the activation input include, but are not limited to, a user input, a location detection on the personal device 105 as being in an area specified for the eatery, an access by the personal device 105 to a wireless network of the eatery, a proximity detection for the electronic menu device 190. Then, the cognitive menu selection engine 120 proceeds with block 320.

In block 320, the cognitive menu selection engine 120 determines whether or not a cognitive selection in rendering the cognitive menu selection service is enabled for a combination of the user 101 and the eatery. If the cognitive menu selection engine 120 determines that the cognitive selection had been enabled for the cognitive menu selection service, then, the cognitive menu selection engine 120 proceeds with block 330 to determine the user state based on cognitive analysis of dynamically collected data for physiological/emotional state of the user 101. If the cognitive menu selection engine 120 determines that the cognitive selection had not been enabled for the cognitive menu selection service, then, the cognitive menu selection engine 120 proceeds with block 360.

The cognitive menu selection engine 120 determines whether or not the cognitive selection is enabled based on various factors. With the cognitive selection enabled, the cognitive menu selection engine 120 collects and analyzes the user state data 130. The user state data 130 can be either consistent over time or dynamically changes moment to moment, with respect to the cognitive menu selection service. Examples of dynamically changing aspects that can affect a choice on food items include, but are not limited to, weather of the day, the user state data 103 based on various readings on the user 101 from the biometric sensors 110 for a momentary mood and physical conditions, signs including blood pressure and heart rate, scheduled calendar events and meetings, work schedule for the day. The cognitive menu selection engine 120 can further collect and analyze other inputs from various data sources that affects a choice by the user 101 from the menus 180, and generates the selection forecasting model. Examples of other data sources include, but are not limited to, past comments by the user 101 on various food items, eateries including restaurants and meal order services, and dietary concerns, and past meal purchases in comparable circumstances.

The user state data 130 that are consistent over time can contribute to the cognitive menu selection service without overhead of dynamic data collection and analysis. Examples of aspects of a persistent nature that can affect the choice of food item and, consequently, that can be preconfigured by the user 101 for the cognitive menu selection engine 120 or otherwise be reflected in the user profile for the cognitive menu selection service include, but are not limited to, existing medical conditions affecting dietary choices such as food allergies, individual dietary preferences with respect to choices of ingredients in respective menu items, as in a vegan diet, a vegetarian diet, a lacto vegetarian diet, an ovo vegetarian diet, a lacto-ovo vegetarian diet, a pescetarian diet, a pollotarian diet, a pollo-pescetarian diet, a pollo-vegetarian, a macrobiotic diet, etc. Certain aspects of persistent user data can be implemented as a cognitive feature, with the data sources extensive enough to cover, for example, medical history/records of the user, fitness levels and goals as appearing on social media postings and comments, grocery shopping lists and purchases, as well as purchase records at all types of eateries that can be converted into the transaction history with the blockchain system 150.

In certain embodiments of the present invention, the cognitive menu selection engine 120 previously built a selection forecasting model by use of the cognitive analytics/machine learning tools 140 based on respective transaction histories for users of the cognitive menu selection service as training data. The selection forecasting model formulates the association between the user state data 130 and the user transaction records 160, specifying the menu items ordered by the user 101 when the user state data 130 is of a specific combination of values. By use of the selection forecasting model, the cognitive menu selection engine 120 can predict a selection data for menu items made by the user 101 based on the user state data 130 with a certain level of confidence, provided that the selection forecasting model had been trained with enough training data, indicating the number of transactions in the transaction histories to be greater than a threshold to enable the cognitive selection.

In block 330, the cognitive menu selection engine 120 gathers inputs for the user state data 130 from all data sources configured for the cognitive selection in the cognitive menu selection service. Examples of the data sources for the cognitive selection include, but are not limited to, the biometric sensors 110 of the personal device 105, event calendars of the user 101, social media comments by the user 101, weather data, seasonal offerings by the eatery to which the user 101 is visiting, medical records of the user 101 including prescriptions on any medications for the user 101, dietary plans, dietary restrictions, or dietary preferences of the user 101 available from a transaction history of the user 101 in the user transaction records 160 via the blockchain system 150. Then, the cognitive menu selection engine 120 proceeds with block 340.

In block 340, the cognitive menu selection engine 120 analyzes the user state data 130 as gathered from block 330 by use of the cognitive analytics/machine learning tools 140.

The cognitive menu selection engine 120 analyzes the user state data 130 for a confidence level in cognitively selecting certain items from the menus 180 of the eatery. Then, the cognitive menu selection engine 120 proceeds with block 350.

In the same embodiments as above where the selection forecasting model has been established by use of the cognitive analytics/machine learning tools 140 based on respective transaction histories for users of the cognitive menu selection service, the cognitive menu selection engine 120 checks the user state data 130 against the selection forecasting model in order to determine if the user state data 130 is sufficient to produce any selection criteria with the confidence level greater than a certain threshold in a current context of order, including, the eatery being visited and the menus 180 that are momentarily available from the eatery.

In block 350, the cognitive menu selection engine 120 determines a user state based on the user state data 130 from block 340. The cognitive menu selection engine 120 utilizes a relationship between the user state data 130 and a certain user state to determine a selection mode, as indicated by the presence of selection criteria, for the user 101 as modeled in the selection forecasting model. For example, the cognitive menu selection engine 120 determines the level of hunger of the user 101, indicating physiological needs for sustenance and/or certain nutrients based on the user state data 130 from respective biometric sensors 110 that measure a blood sugar level, an activity level, and/or calorie consumption. For another example, the cognitive menu selection engine 120 determines a stress level of the user 101 based on the user state data 130 from the biometric sensors 110 generating inputs of a blood pressure, a heart rate, an adrenaline level, and/or a voice stress level. Then, the cognitive menu selection engine 120 proceeds with block 220 of FIG. 2.

In certain embodiments of the present invention, the cognitive menu selection engine 120 includes an emotional state of the user 101 in the user state, to further facilitate an optimal selection with the menus 180. The cognitive menu selection engine 120 determines the emotional state of the user 101 based on the user state data 130 the biometric sensors 110 generating inputs of voice tone, word counts, and the level of communication in recent voice calls, text messages, and other forms of communication by the user 101 that can be accessible by the cognitive menu selection service.

In certain embodiments of the present invention, the cognitive menu selection engine 120 establishes dietary preferences and restrictions in the selection forecasting model based on various factors. For example, dietary preferences in the selection forecasting model can be established based on user monitor data, including, but not limited to, social media posting mentioning a certain diet, a recent visit to an eatery based on locations of the personal device 105, a web browsing history on the personal device 105 relevant to certain diet/nutritional concerns. For another example, dietary restrictions in the selection forecasting model can be established based on further user monitor data, including, but not limited to, user configured parameters in a user profile for the cognitive menu selection service as to food allergies, diabetes, and any medically requested dietary restrictions, dietary goals as to types of foods, nutrients, and calories. In certain embodiments of the present invention, the cognitive menu selection engine 120 can further utilize the transaction history of the user transaction records 160 in tracking individual transactions and establishes a dietary trend of the user 101 in the selection forecasting model, in which the cognitive menu selection engine 120 specifies a certain substitute and/or alternative menus for variety in meal choices and more balanced diet for the user 101 within the bounds of preferences.

In certain embodiments of the present invention, the user state can be specified as a class having a set of combinations of the user state data 130 that corresponds to a certain group of items from the menus 180 in the selection forecasting model as generated by the cognitive analytics/machine learning tools 140. For example, the user state can be identified as "celebrating" based on respective values of the user state data 130 for a certain level of blood pressure, heart rate, and voice tone, and a certain group of menu items that had been selected in the past as demonstrated in the transaction history for the user 101 corresponds to the user state of "celebrating" in the selection forecasting model.

In block 360, the cognitive menu selection engine 120 determines a user state for the selection mode based on the user state data 130 that had been statically configured by the user 101 on selecting items from the menus 180, because the cognitive menu selection engine 120 is not enabled for cognitively selecting items from the menus 180, as previously determined in block 320. Then, the cognitive menu selection engine 120 proceeds with block 220 of FIG. 2.

As noted above, certain factors affecting choices for items in the menus 180 can be configured statically in certain cases. A dietary plan set for a fitness goal, personal preferences as to certain ingredients and cooking methods, or a dietary restriction based on medical conditions such as food allergies, diabetes, does not change often for the user 101 and needs no dynamic data collection and analysis, and accordingly, such parameters can be statically configured into the user state data 130 by the user 101. Certain dietary preferences cannot be detectable from monitoring the user state data 130 as collected from the biometric sensors 110, and accordingly, statically configuring such preferences can improve the accuracy of item selections without incurring processing overhead corresponding to a cognitive selection. Also, even though certain factors can be detected from dynamically analyzing the user state data 130 for the cognitive selection of menu items, based on the requirements on a number of transactions in the transaction history for the user 101, a cognitive selection cannot be enabled yet with the selection forecasting model in preparation.

Figure 4:
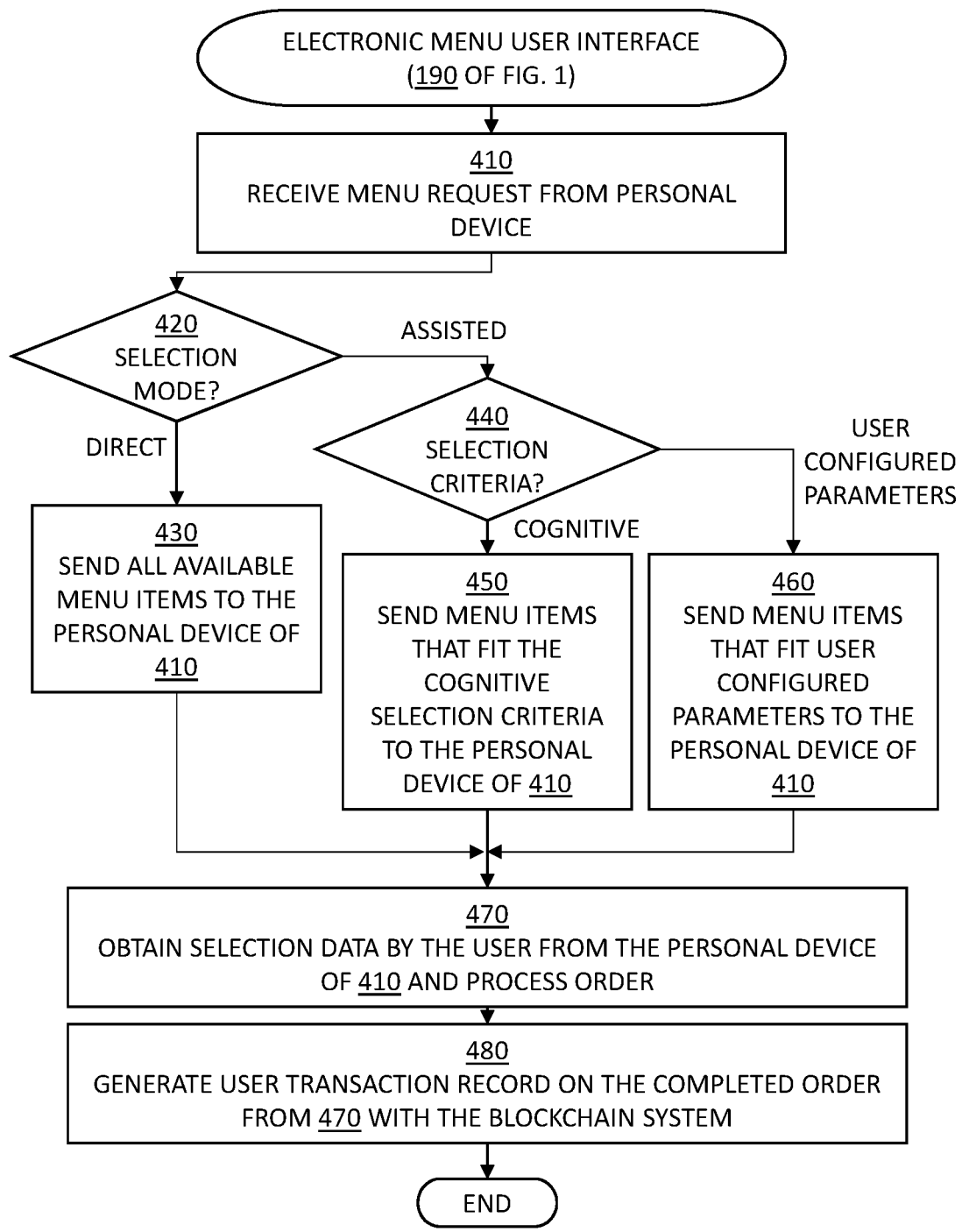
FIG. 4 depicts a flowchart of operations performed by the electronic menu device of the restaurant electronic menu system, in accordance with one or more embodiments set forth herein.

FIG. 4 depicts a flowchart of operations performed by the electronic menu device 190 of the restaurant electronic menu system 170, in accordance with one or more embodiments set forth herein.

In block 410, the electronic menu device 190 receives a request for menu items from the personal device 105. Then, the electronic menu device 190 proceeds with block 420.

In block 420, the electronic menu device 190 determines a selection mode with the cognitive menu selection service by ascertaining whether or not the request for menu items as received in block 410 includes any selection criteria. If the electronic menu device 190 determines that the request received in block 410 does not include any selection criteria, then, the electronic menu device 190 determines that the cognitive menu selection service is to be performed in a direct selection mode and proceeds with block 430. If the electronic menu device 190 determines that the request received in block 410 includes certain selection criteria, then, the electronic menu device 190 determines that the cognitive menu selection service is to be performed in an assisted selection mode and proceeds with block 440.

In block 430, the electronic menu device 190 sends all available items in the menus 180 to the personal device 105 that sent the request received in block 410. Then, the electronic menu device 190 proceeds with block 470.

In block 440, the electronic menu device 190 determines a kind of the selection criteria included in the request for menu items as received in block 410. If the electronic menu device 190 determines that the selection criteria is based on cognitive analysis of the user state data 130, then the electronic menu device 190 proceeds with block 450. If the electronic menu device 190 determines that the selection criteria is based on user-configured parameters for the cognitive menu selection service, then, the electronic menu device 190 proceeds with block 460.

In block 450, the electronic menu device 190 selects items in the menus 180 that satisfies the cognitive selection criteria as specified in the request from block 410 and sends the selected menu items to the personal device 105 that sent the request received in block 410. Then, the electronic menu device 190 proceeds with block 470.

In block 460, the electronic menu device 190 selects items in the menus 180 that satisfies the selection criteria according to the user-configured parameters as specified in the request from block 410 and sends the selected menu items to the personal device 105 that sent the request received in block 410. Then, the electronic menu device 190 proceeds with block 470.

In block 470, the electronic menu device 190 obtains the selection data by the user 101 as selected from the menu items sent in blocks 430, 450, or 460 from the personal device 105 that had sent the menu request in block 410. The electronic menu device 190 subsequently processes an order for the user 101 based on the selection data from the user 101 as obtained. Then, the electronic menu device 190 proceeds with block 480.

In block 480, the electronic menu device 190 generates the user transaction record 160 corresponding to the order based on the selection data from block 470 with the blockchain system 150, in concert with the personal device 105. The electronic menu device 190 sends meta information regarding a type of the eatery and the selection data as received in block 470 to generate the user transaction record 160 for the user 101. Then, the electronic menu device 190 concludes processing the current instance of the customized selection service.

Figure 5:
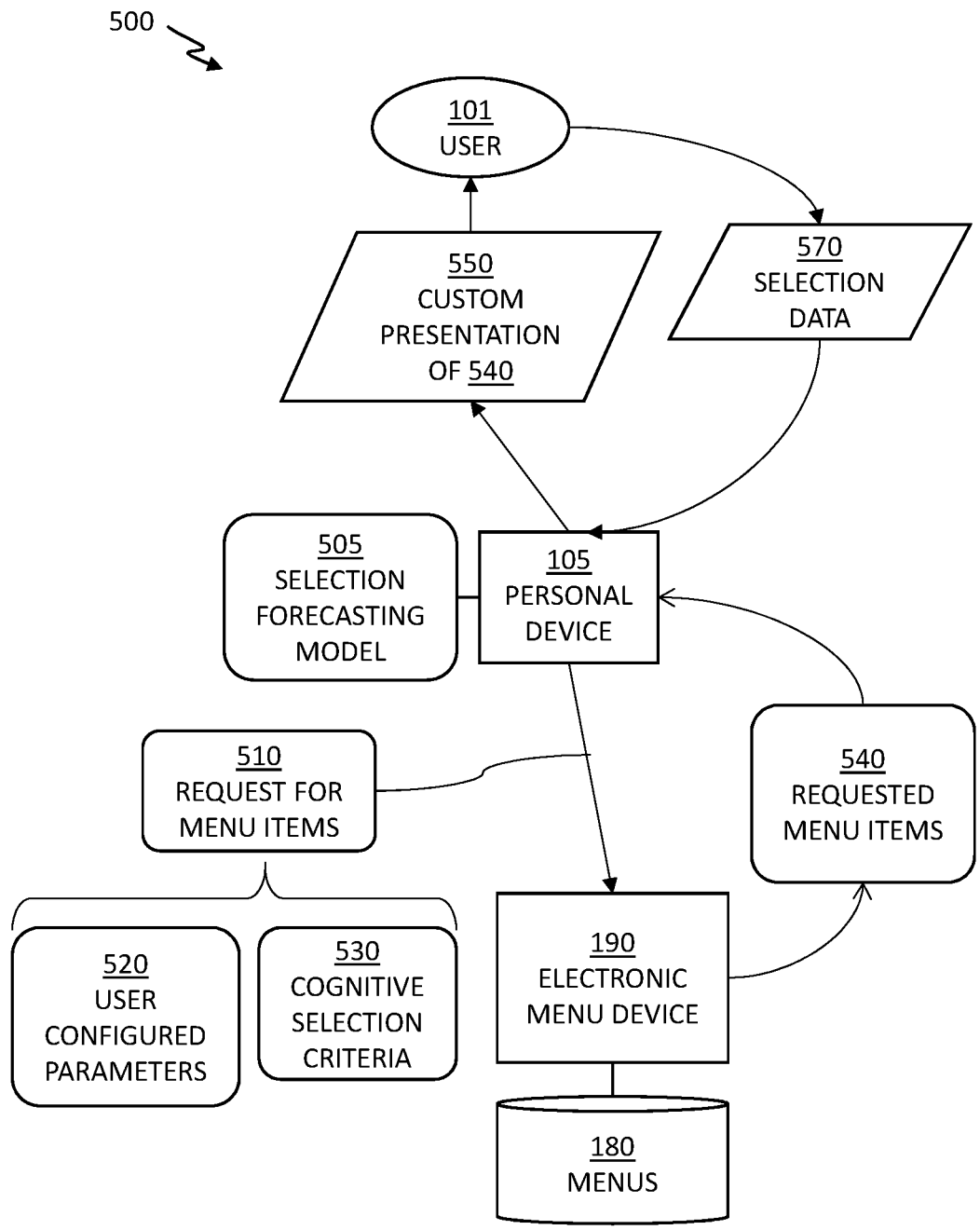
FIG. 5 depicts exemplary data flows present in the cognitive menu selection service, in accordance with one or more embodiments set forth herein.

FIG. 5 depicts exemplary data flows present in the cognitive menu selection service, in accordance with one or more embodiments set forth herein.

As noted, the personal device 105 collects the user state data 130, determines the user state for the selection mode/selection criteria and applies the user state to a selection forecasting model 505. Prior to activate a current instance of the cognitive menu selection service, the selection forecasting model 505 is built by the cognitive analytics/machine learning tools 140 based on previous transaction history of the user 101 as training data. The user 101 can be modeled as an individual for preferences, dietary habits, goals, restrictions, and interests, or a member of a certain group with similar dietary interest, concerns, and/or restrictions, as for fitness, culture, or medical conditions.

The personal device 105 sends a request for menu items 510 to the electronic menu device 190, in block 240 or 250 of FIG. 2 as performed by the cognitive menu selection engine 120 of the personal device 105. The request for menu items 510 optionally includes user-configured parameters 520 and/or cognitive selection criteria 530. The cognitive menu selection engine 120 determines the cognitive selection criteria 530 as described in blocks 320, 330, 340, and 350 of FIG. 3. The cognitive menu selection engine 120 determines the user-configured parameters 520 as described in blocks 320 and 360 of FIG. 3.

The electronic menu device 190 receives the request for menu items 510 in block 410 of FIG. 4, and selects requested menu items 540 that correspond to the request 510, and that also satisfy the user-configured parameters 520 and/or the cognitive selection criteria 530, where applicable. The electronic menu device 190 subsequently sends the requested menu items 540 to the personal device 105.

Once the requested menu items 540 is obtained from the electronic menu device 190, the personal device 105 presents the requested menu items 540 to the user 101. A custom presentation of the requested menu items 550 can be implemented by use of visual/audio presentation as well as augmented reality presentation, based on user interface of the personal device 105. For example, a dish can be presented with a short video clip with sizzling, cutting, crunching, or any applicable sounds, introduction of the characteristics including ingredients, flavor, nutritional facts, and possibly with a certain holographic presentation of the dish as prepared on the table, with table settings, and an aroma of the dish, provided a 4D augmented reality functionality is available on the personal device 105 or accessible by the personal device 105 for the custom presentation of the requested items 550 at the eatery.

The custom presentation of the requested menu items 550 can facilitate a real restaurant visit experience for the user 101 when the eatery offers the cognitive menu selection service over on-line. The custom presentation of the requested menu items 550 with augmented reality implementation can, for example, presents the serving staffs, restaurant interior, table setting and tableware as well as the requested menu items 540, in order to enhance user experience with the cognitive menu selection service and to encourage the user 101 to make selections for an order with the eatery.

The user 101 is presented with the custom presentation of the requested menu items 550, and the user 101 selects certain items from the presented menu items, which will be sent back to the personal device 105 as selection data 570. The user 101 can more easily and surely find menu items from the custom presentation of the requested menu items 550 than going through conventional menus. As noted, the selection data 570 is relayed to the electronic menu device 190 and the user transaction record 160 corresponding to the selection data 570 is generated with the blockchain system 150 by both the cognitive menu selection engine 120 at block 280 of FIG. 2 and the electronic menu device 190 at block 480 of FIG. 4.

Certain embodiments of the present invention automatically examines menu items of an eatery and makes cognitive selections based on a user state, including physiological and emotional state, nutritional needs, dietary plans and restrictions. Certain embodiments of the present invention automatically builds a selection forecasting model by use of cognitive analytics and machine learning based on blockchain mining of transaction histories and user state data. Certain embodiments of the present invention automatically updates items of menus for a subscribing eatery, in order to ensure that the user would have access to all items of the menus. Certain embodiments of the present invention further improves convenience of the users by automatically creating recommendations based on biometric sensor inputs on the user, and by implementing user preferences and dietary interests into the selection forecasting model. Certain embodiments of the present invention utilizes a blockchain system to record and to share user transaction records securely and safely amongst participating entities. Certain embodiments of the present invention can automatically filter menu items that do not meet the dietary restrictions and plans in order to assist the user to make healthy meal choices. Certain embodiments of the present invention can be implemented by use of a cloud platform/data center in various types including a Software-as-a-Service (SaaS), Platform-as-a-Service (PaaS), Database-as-a-Service (DBaaS), and combinations thereof based on types of subscription on the cognitive menu selection service. The cognitive menu selection service can be provided for subscribed business entities in restaurant industry and/or on-line meal order services, as well as individual users from any location in the world.

Figure 6:
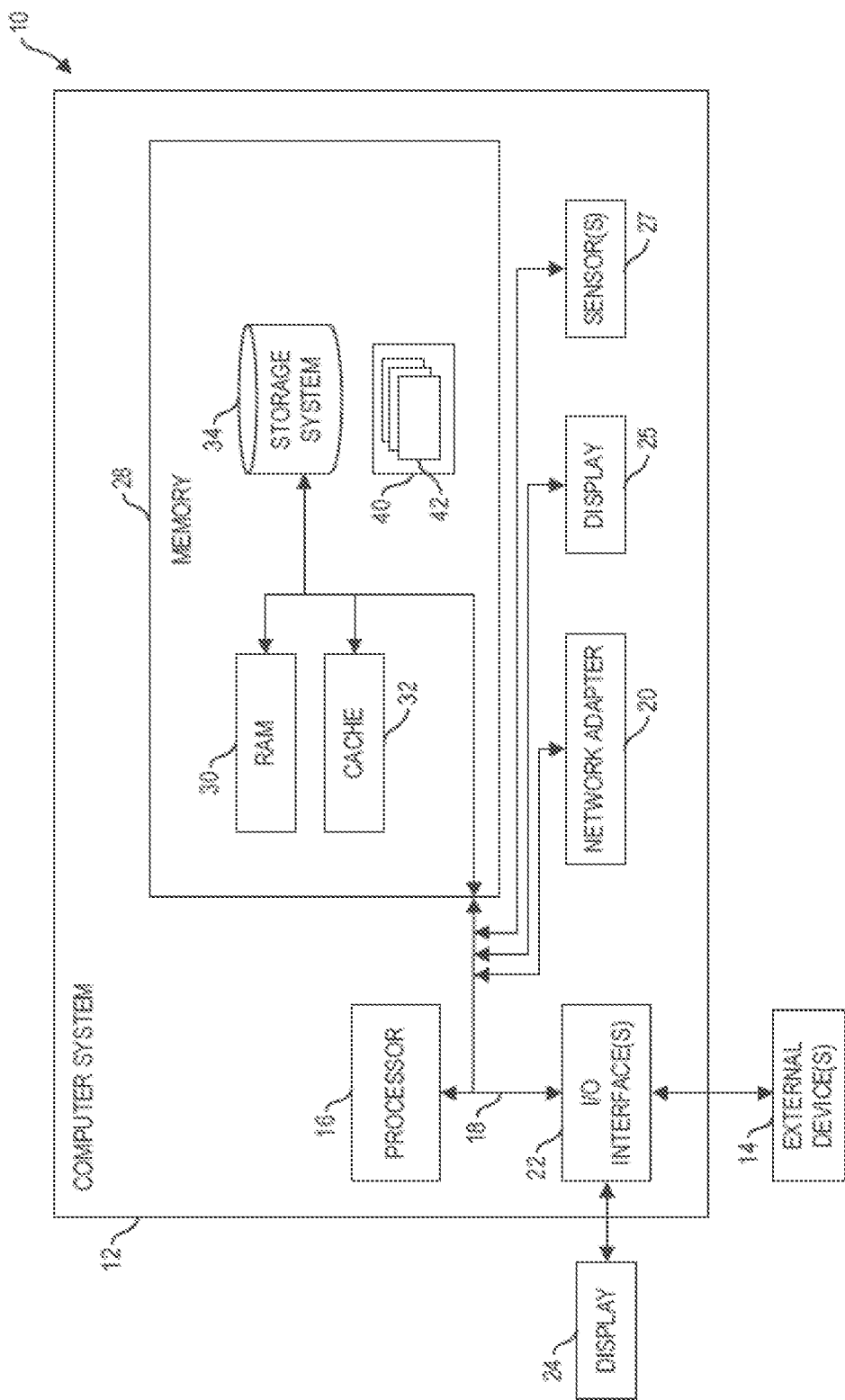
FIG. 6 depicts a cloud computing node according to an embodiment of the present invention.
Figure 7:
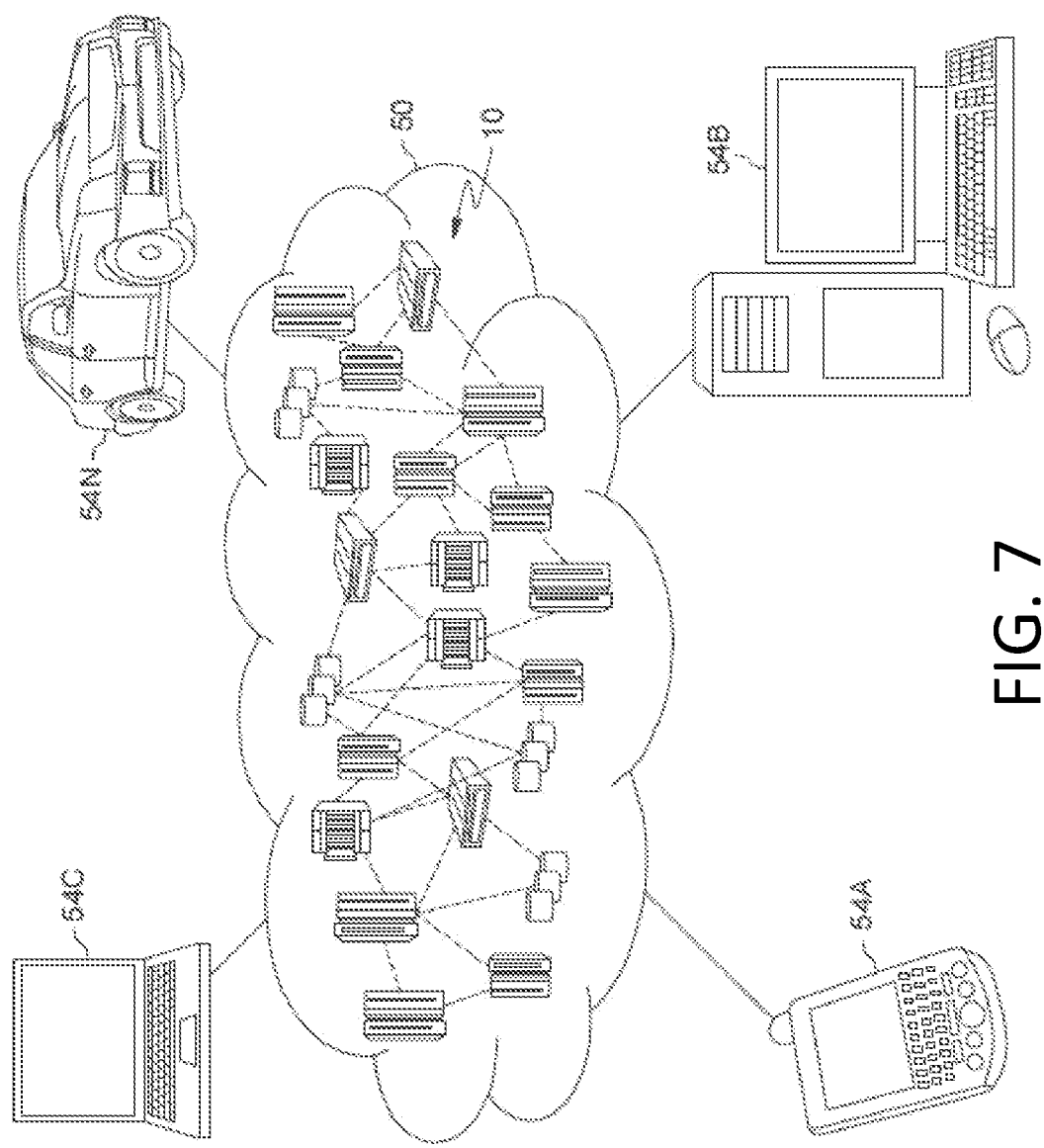
FIG. 7 depicts a cloud computing environment according to an embodiment of the present invention.
Figure 8:
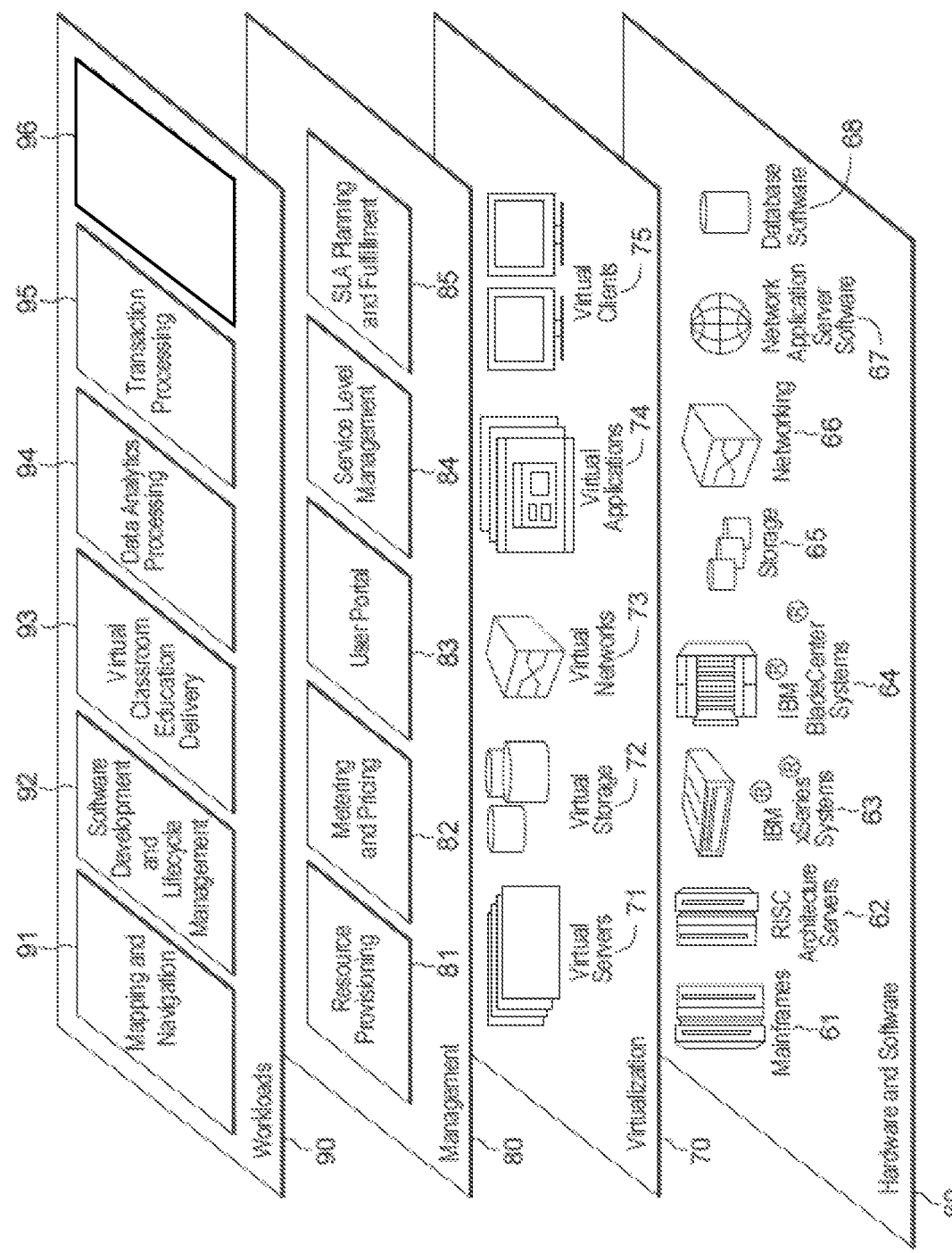
FIG. 8 depicts abstraction model layers according to an embodiment of the present invention.

FIGS. 6-8 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 6, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the cognitive menu selection engine 120 and the electronic menu device 190 of FIG. 1, respectively. Program processes 42, as in the cognitive menu selection engine 120 and the electronic menu system 170 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18.

In addition to or in place of having external devices 14 and the display 24, which can be configured to provide user interface functionality, computing node 10 in one embodiment can include another display 25 connected to bus 18. In one embodiment, the display 25 can be configured as a touch screen render and can be configured to provide user interface functionality, e.g. can facilitate virtual keyboard functionality and input of total data. Computer system 12 in one embodiment can also include one or more sensor device 27 connected to bus 18. One or more sensor device 27 can alternatively or in addition be connected through I/O interface(s) 22. The one or more sensor device 27 can include a Global Positioning Sensor (GPS) device in one embodiment and can be configured to provide a location of computing node 10. In one embodiment, the one or more sensor device 27 can alternatively or in addition include, e.g., one or more of a camera, a gyroscope, a temperature sensor, a humidity sensor, a pulse sensor, a blood pressure (BP) sensor or an audio input device.

It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the cognitive menu selection services as provided by the electronic menu system and/or the cognitive analytics/machine learning tools 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer program product comprising:
   a computer readable storage medium readable by one or more processor and storing instructions for execution by the one or more processor for performing a method comprising:
   ascertaining a user state of a user based on user state data gathered from a personal device of the user, by running the user state data through a selection forecasting model by use of machine learning as being trained with previous user state data and corresponding user states, wherein the user is being provided with a cognitive menu selection service for an eatery by use of an electronic menu system;
   determining, based on the selection forecasting model, selection criteria for the user on one or more items from menus of the eatery in a request, wherein the selection criteria correspond to the user state from the ascertaining, wherein the selection criteria is determined by the personal device of the user with use of analysis of the user state data, and wherein the request including the selection criteria is sent from the personal device of the user to the electronic menu system, wherein the electronic menu system is remote from the personal device of the user;
   obtaining from the electronic menu system, the one or more items from the menus of the eatery, based on sending the request to the electronic menu system, wherein the one or more items correspond to the selection criteria in the request;
   presenting the one or more items from the obtaining to the user, by use of a customized virtual reality interface on the personal device of the user, the presenting comprising: playing, by the personal device of the user, a multi-dimensional augmented reality (AR) presentation clip, the presentation clip associated with the one or more item in the electronic menu system from the menus of the eatery, wherein the presentation clip includes ingredients, flavor, and nutritional facts, respectively corresponding to the one or more item, and wherein the presentation clip in the electronic menu system presents a certain holographic presentation of a dish including the one or more item from the menus of the eatery being prepared for the user on a table, with table settings; and
   in response to the presentation clip presenting the certain holographic presentation of the dish including the one or more item from the menus of the eatery being prepared for the user on the table, receiving selection data by the user amongst the one or more items from the presenting and sending the selection data to the electronic menu system to place an order from the eatery.

2. The computer program product of claim 1, further comprising:
   training, prior to the ascertaining, the selection forecasting model that associates the user state data with the user state, wherein training data for the selection forecasting model include previous transactions in a transaction history of the user and previous user state data of the user respective to previous transactions, wherein the user state data include inputs from biometric sensors on the personal device of the user and inputs from pre-configured data sources for dietary preferences and restrictions for the user;
   generating a user transaction record corresponding to the order with the eatery based on the selection data by use of a blockchain system, wherein the user transaction record includes the user state data, the selection data, and the order;
   updating the transaction history of the user with the user transaction record; and
   iterating the training of the selection forecasting model with the user transaction record from the updating, the user state data, and the selection data, to thereby train the selection criteria for future instances of the cognitive menu selection service.

3. The computer program product of claim 1, wherein the user state includes a level of a physiological need for particular nutrients and a stress level, and wherein the selection criteria include any preconfigured dietary restrictions.

4. The computer program product of claim 1, wherein the user state includes a level of a physiological need for particular nutrients.

5. The computer program product of claim 1, wherein the user state includes a stress level.

6. The computer program product of claim 1, wherein the selection criteria include any preconfigured dietary restrictions.

7. A computer implemented method, comprising:
   ascertaining a user state of a user based on user state data gathered from a personal device of the user, by miming the user state data through a selection forecasting model by use of machine learning as being trained with previous user state data and corresponding user states, wherein the user is being provided with a cognitive menu selection service for an eatery by use of an electronic menu system;
   determining, based on the selection forecasting model, selection criteria for the user on one or more items from menus of the eatery in a request, wherein the selection criteria correspond to the user state from the ascertaining, wherein the selection criteria is determined by the personal device of the user with use of analysis of the user state data, and wherein the request including the selection criteria is sent from the personal device of the user to the electronic menu system, wherein the electronic menu system is remote from the personal device of the user;
   obtaining from the electronic menu system, the one or more items from the menus of the eatery, based on sending the request to the electronic menu system, wherein the one or more items correspond to the selection criteria in the request;
   presenting the one or more items from the obtaining to the user, by use of a customized virtual reality interface on the personal device of the user, the presenting comprising:
   playing, by the personal device of the user, a multi-dimensional augmented reality (AR) presentation clip, the presentation clip associated with the one or more item in the electronic menu system from the menus of the eatery, wherein the presentation clip includes ingredients, flavor, and nutritional facts, respectively corresponding to the one or more item, and wherein the presentation clip in the electronic menu system presents a certain holographic presentation of a dish including the one or more item from the menus of the eatery being prepared for the user on a table, with table settings; and
   in response to the presentation clip presenting the certain holographic presentation of the dish including the one or more item from the menus of the eatery being prepared for the user on the table, receiving selection data by the user amongst the one or more items from the presenting and sending the selection data to the electronic menu system to place an order from the eatery.

8. The computer implemented method of claim 7, wherein the user state includes a level of a physiological need for particular nutrients.

9. The computer implemented method of claim 7, wherein the user state includes a stress level.

10. The computer implemented method of claim 7, wherein the selection criteria include any preconfigured dietary restrictions.

11. The computer implemented method of claim 7, further comprising:
    training, prior to the ascertaining, the selection forecasting model that associates the user state data with the user state, wherein training data for the selection forecasting model include previous transactions in a transaction history of the user and previous user state data of the user respective to previous transactions, wherein the user state data include inputs from biometric sensors on the personal device of the user and inputs from pre-configured data sources for dietary preferences and restrictions for the user.

12. The computer implemented method of claim 7, wherein the user state includes a level of a physiological need for particular nutrients and a stress level, and wherein the selection criteria include any preconfigured dietary restrictions.

13. The computer implemented method of claim 7, further comprising:
    training, prior to the ascertaining, the selection forecasting model that associates the user state data with the user state, wherein training data for the selection forecasting model include previous transactions in a transaction history of the user and previous user state data of the user respective to previous transactions, wherein the user state data include inputs from biometric sensors on the personal device of the user and inputs from pre-configured data sources for dietary preferences and restrictions for the user;
    generating a user transaction record corresponding to the order with the eatery based on the selection data by use of a blockchain system, wherein the user transaction record includes the user state data, the selection data, and the order;
    updating the transaction history of the user with the user transaction record; and
    iterating the training of the selection forecasting model with the user transaction record from the updating, the user state data, and the selection data, to thereby train the selection criteria for future instances of the cognitive menu selection service.

14. A system comprising:
a memory;
one or more processor in communication with the memory; and
program instructions executable by the one or more processor via the memory to perform a method comprising:
  ascertaining a user state of a user based on user state data gathered from a personal device of the user, by running the user state data through a selection forecasting model by use of machine learning as being trained with previous user state data and corresponding user states, wherein the user is being provided with a cognitive menu selection service for an eatery by use of an electronic menu system;
  determining, based on the selection forecasting model, selection criteria for the user on one or more items from menus of the eatery in a request, wherein the selection criteria correspond to the user state from the ascertaining, wherein the selection criteria is determined by the personal device of the user with use of analysis of the user state data, and wherein the request including the selection criteria is sent from the personal device of the user to the electronic menu system, wherein the electronic menu system is remote from the personal device of the user;
  obtaining from the electronic menu system, the one or more items from the menus of the eatery, based on sending the request to the electronic menu system, wherein the one or more items correspond to the selection criteria in the request;
  presenting the one or more items from the obtaining to the user, by use of a customized virtual reality interface on the personal device of the user, the presenting comprising: playing, by the personal device of the user, a multi-dimensional augmented reality (AR) presentation clip, the presentation clip associated with the one or more item in the electronic menu system from the menus of the eatery, wherein the presentation clip includes ingredients, flavor, and nutritional facts, respectively corresponding to the one or more item, and wherein the presentation clip in the electronic menu system presents a certain holographic presentation of a dish including the one or more item from the menus of the eatery being prepared for the user on the table, with table settings; and
  in response to the presentation clip presenting the certain holographic presentation of the dish including the one or more item from the menus of the eatery being prepared for the user on the table, receiving selection data by the user amongst the one or more items from the presenting and sending the selection data to the electronic menu system to place an order from the eatery.

15. The system of claim 14, wherein the user state includes a level of a physiological need for particular nutrients.

16. The system of claim 14, wherein the user state includes a stress level.

17. The system of claim 14, wherein the selection criteria include any preconfigured dietary restrictions.

18. The system of claim 14, further comprising:
  training, prior to the ascertaining, the selection forecasting model that associates the user state data with the user state, wherein training data for the selection forecasting model include previous transactions in a transaction history of the user and previous user state data of the user respective to previous transactions, wherein the user state data include inputs from biometric sensors on the personal device of the user and inputs from preconfigured data sources for dietary preferences and restrictions for the user.

19. The system of claim 14, wherein the user state includes a level of a physiological need for particular nutrients and a stress level, and wherein the selection criteria include any preconfigured dietary restrictions.

20. The system of claim 14, further comprising:
  training, prior to the ascertaining, the selection forecasting model that associates the user state data with the user state, wherein training data for the selection forecasting model include previous transactions in a transaction history of the user and previous user state data of the user respective to previous transactions, wherein the user state data include inputs from biometric sensors on the personal device of the user and inputs from preconfigured data sources for dietary preferences and restrictions for the user;
  generating a user transaction record corresponding to the order with the eatery based on the selection data by use of a blockchain system, wherein the user transaction record includes the user state data, the selection data, and the order;
  updating the transaction history of the user with the user transaction record; and
  iterating the training of the selection forecasting model with the user transaction record from the updating, the user state data, and the selection data, to thereby train the selection criteria for future instances of the cognitive menu selection service.

* * * * *